United States Patent [19]

Virga

[11] Patent Number: 4,896,552
[45] Date of Patent: Jan. 30, 1990

[54] BALLSCREW FOLLOWER AND METHOD OF MAKING AND OPERATING THE SAME

[75] Inventor: Joseph P. Virga, Morgan Hill, Calif.
[73] Assignee: Ballscrews & Actuators Co., Inc.
[21] Appl. No.: 145,383
[22] Filed: Jan. 19, 1988
[51] Int. Cl.$^4$ ............................................. F16H 13/08
[52] U.S. Cl. ............................. 74/89.15; 74/424.8 R; 74/441; 74/459
[58] Field of Search ............... 74/459, 89.15, 424.8 R, 74/441

[56] References Cited

U.S. PATENT DOCUMENTS

| | | | |
|---|---|---|---|
| 2,855,791 | 10/1958 | Hogan | 74/459 |
| 3,009,367 | 11/1961 | Striggow | 74/459 |
| 3,532,004 | 10/1970 | Nilsson | 74/459 |
| 3,589,202 | 6/1971 | Stanley | 74/25 |
| 3,720,116 | 3/1973 | Better et al. | 74/459 |
| 3,990,317 | 11/1976 | Gilman et al. | 74/25 |
| 4,074,587 | 2/1978 | Brusasco | 74/424.8 R |
| 4,141,255 | 2/1979 | Nilsson | 74/25 |
| 4,186,620 | 2/1980 | Brusasco | 74/424.8 R |
| 4,224,831 | 9/1980 | Nilsson | 74/89 |
| 4,246,802 | 1/1981 | Rasmussen | 74/25 |
| 4,253,342 | 3/1981 | Uhing | 74/89 |
| 4,411,166 | 10/1983 | Marcovici | 74/89 |
| 4,660,431 | 4/1987 | Heine | 74/424.8 R |

OTHER PUBLICATIONS

Catalog; Ball Screws & Actuators Co., Inc. (8/87).
Catalog; Comptrol, Inc. (4/84).
Catalog; Thomson Industries, Inc. (11/85).

*Primary Examiner*—Leslie A. Braun
*Assistant Examiner*—Scott Anchell
*Attorney, Agent, or Firm*—A. C. Smith

[57] ABSTRACT

An improved ball screw and follower and method of making the same includes one or more helical grooves along the leadscrew with mating grooves and pitch within the follower to form a course therebetween for the rotational positioning therein of a plurality of balls in rolling engagement with the leadscrew and follower. Backlash is substantially eliminated by cutting a central section of the follower along the land between adjacent grooves in the follower for at least one turn to form thereby a torsionally-resilient section that torsionally couples the resulting leading and trailing sections of the follower together in a manner that resiliently flexes along the course in which the balls rotate.

4 Claims, 3 Drawing Sheets

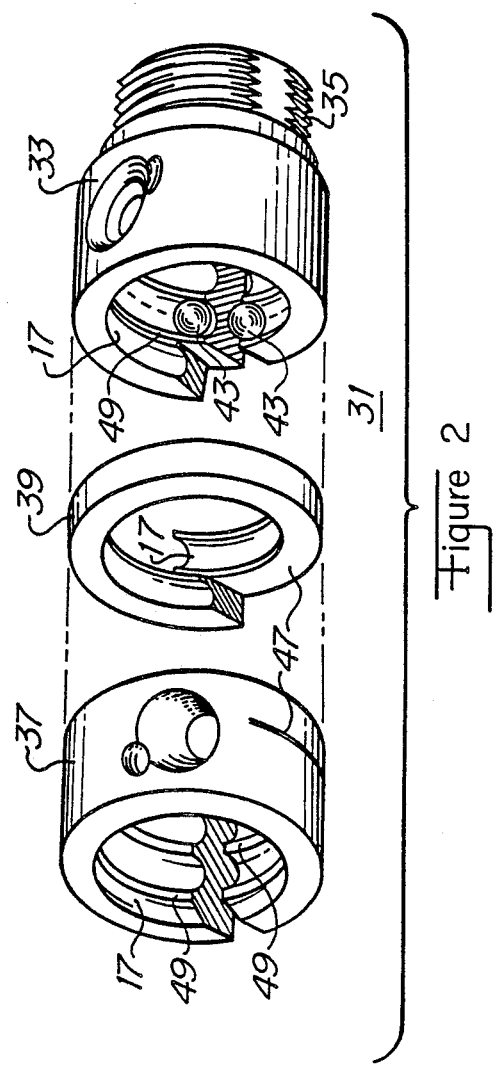
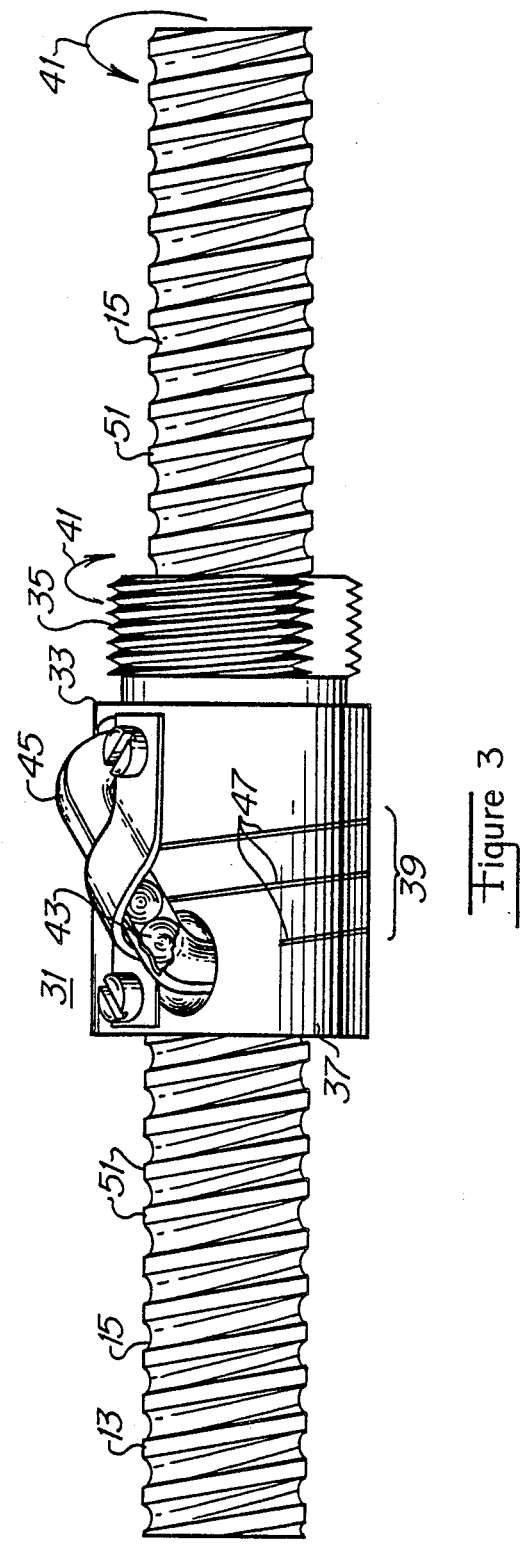

BALLSCREW FOLLOWER AND METHOD OF MAKING AND OPERATING THE SAME

BACKGROUND OF THE INVENTION

This invention relates to ballscrew actuators and more particularly to an improved apparatus and means for reducing backlash and deadband positional inaccuracies in such actuators.

Conventional ball screw actuators commonly include a leadscrew having a helical groove along the length, and a follower with a mating groove that cooperates with the groove in the leadscrew to form a course or race for ball bearings. This course usually contains a plurality of ball bearings which operate in rolling contact with both the leadscrew groove and follower groove as one is relatively rotated with respect to the other. The ball bearings are thus positionally displaced along the course as the leadscrew and follower relatively rotate, and such course is therefore commonly closed by a channel that is coupled from end to end of the course through the follower. In this way, the balls may be continuously circulated from end to end through the course as relative rotation progresses.

One common difficulty encountered with conventional ball screw actuators of this type is that the mating grooves in both the leadscrew and in the follower may not form a course of accurate dimension throughout to accommodate the balls therein in rolling contact simultaneously with both the leadscrew groove and follower groove. If the balls are of diameter slightly smaller than the dimensions of the course, then there may be axial and lateral 'play' or backlash between the leadscrew and follower, and this contributes to positional inaccuracies for a specific relative angular rotation of the two elements. Various schemes are known for eliminating such backlash, including slightly altering the pitch of the leadscrew or follower groove relative to the other so that some balls within the course are in compressional loading toward the center of the follower, while others of the balls within the course are in compressional loading toward the ends of the follower. A similar scheme relies upon another follower rigidly linked to the one follower with a fixed angular displacement between them similar to locking two nuts together on a common bolt. Still another scheme relies upon keyed, axially slideable follower end sections that are spring-biased apart.

These schemes for eliminating positional inaccuracies in ball screw actuators have not been acceptable in certain precision applications due to excessive torque requirements, added weight and inertia of two followers, and the like.

SUMMARY OF THE INVENTION

Accordingly, it is an object of the present invention to provide an improved follower for a leadscrew which substantially eliminates the deadband or backlash between the leadscrew and follower. In accordance with the method and means of the present invention, this is accomplished by forming a follower with a convolute section intermediate the end sections of the follower, which convolute section substantially follows the helical groove within the follower substantially one complete revolution to provide a continuous support for the groove in the follower from end to end thereof. More importantly, such convolute section forms a torsionally and axially resilient coupling between the leading and trailing end sections of the follower to overcome slight dimensional anomalies along the helical groove of the leadscrew.

DESCRIPTION OF THE DRAWINGS

FIG. 2 is an exploded cutaway and partial sectional view of the ball screw follower in accordance with one embodiment of the invention;

FIG. 3 is cutaway plan view of the assembled ball screw follower of FIG. 1; and

DESCRIPTION OF THE PREFERRED EMBODIMENT

Figure 1A:
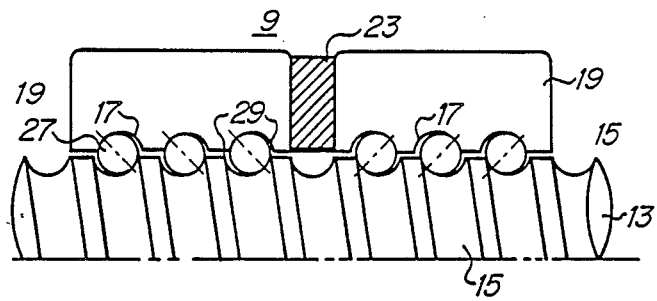
FIGS. 1(a) and (b) partial sectional views of conventional loading techniques associated with ball screw followers.
Figure 1B:
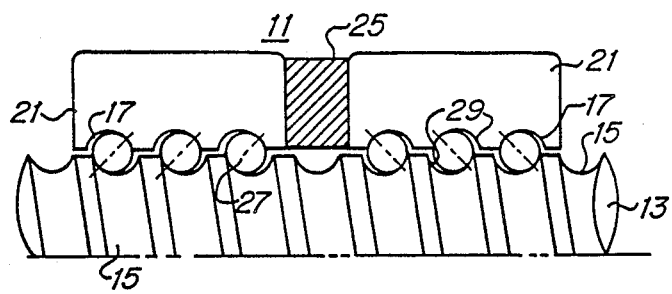

Referring now to FIGS. 1(a) and (b), there are shown sectional views of conventional followers 9, 11 in which the followers 9, 11 and leadscrews 13 include helical grooves 15, 17 of similar pitches but with the end section of the follower 19, 21 slightly displaced axially along the helixes via shim plates 23, 25 so that the balls 27 near the ends of the course 29 formed by the grooves 15, 17 are compressionally loaded toward the center of the follower, or the balls 27 near the ends of the course are compressionally loaded toward the ends of the follower. In this way, all possible backlash or deadband, for example attributable to balls 27 of slightly smaller diameter than required to completely fill the dimensions within the course 29 between the leadscrew and follower grooves 15, 17, should be eliminated.

Alternatively, deadband may be substantially eliminated in conventional ball screw followers by forming grooves in the follower with pitch that is slightly different from the pitch of the leadscrew groove such that balls in one portion of the course formed thereby are compressionally loaded toward opposite ends of the follower.

In accordance with the present invention, an improved follower, and method for making the same, relies upon a central convolute section interposed between end sections of the follower to provide a continuous support for the course and the balls circulating therein, and to provide torsionally and axially resilient coupling between the end sections. Specifically, with reference to FIGS. 2 and 3, there are shown a leadscrew 13 with the groove 15 of a single helix disposed along the length of the leadscrew. The follower 31 includes a referencing or leading end section 33 that attaches via threads 35, or the like, to a positionable object (not shown), and a trailing and section 37 that is spaced from the leading end section by the intermediate convolute section 39. A continuous groove 17 is formed within the follower through some portion of the leading end section 33, the convolute section 39, and some portion of the trailing end section 37. This groove 17 is at substantially the same helical pitch as the groove 15 on the leadscrew to form therewith a course for retaining a plurality of balls 43 therein in rolling contact with both the follower 31 and the leadscrew 13. The grooves 15 and 17 may be formed in conventional manner in the shape of a 'gothic arch' to provide two-point precision contact between the balls 43 and the leadscrew 13 and follower 31. The balls 43 thus reposition in rolling movement along the course as the leadscrew 13 and follower 31 undergo relative 41 rotation therebetween. The balls 43 are taken up from and fed into the course substantially tangentially relative to the groove 17 and are recirculated from one end of the course through a race-return conduit 45 to the other end of the course as relative rotation between leadscrew 13 and follower 31 progresses.

The convolute section 39 intermediate the end sections 33 and 37 of the follower 31 is formed, in one embodiment of the present invention, by cutting 47 the body of the follower 31 along the helical path of the groove 15, 17 for at least substantially one revolution or turn to form an integral 'coil spring' between end sections 33, 37. Specifically, the cut 47 is aligned with the lands 49, 51 between groove 15 in the leadscrew 13 and follower groove 17 in the follower 31. This leaves the groove 17 unaltered and continuous along the course between end sections 33, 37. The cut 47 may be achieved using conventional electro-erosion machining techniques, or the like, to Provide at least one gap for relative slight axial and torsional movements between the end sections 33, 37 of the follower 31. Thus, slight anomalies in pitch linearity along the leadscrew 13 (i.e. incremental variations in pitch of the groove 15 from turn to turn), and slight variations in cylindricity of the leadscrew 13 are relieved and taken up by the resilience of the convolute section 39 between the end sections 33, 37. In addition, slight pre-loading of the ball screw structure attributable to over size balls 43 or reduced dimensions in the course causes the convolute section 39 to 'unwind' its resilient coil-spring structure slightly, with attendant torsional disPlacement of the end sections 33, 37 against the resilient restoring force of the convolute section 39. The follower 31 thus maintains high positional accuracy along the leadscrew 13 with substantially all 'play', deadband, and backlash eliminated without incurring significant increase in operating torque.

Figure 4:
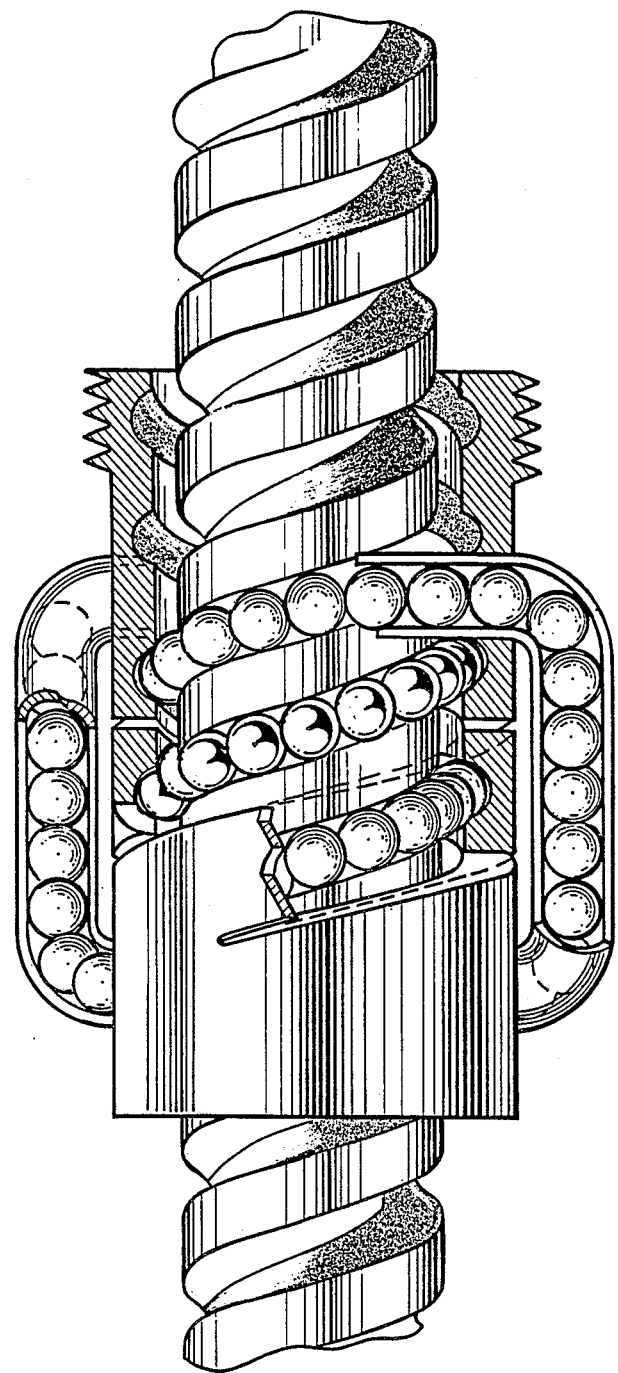
FIG. 4 is a cutaway view of the ball screw follower according to another embodiment of the preset invention.

For ballscrew actuator applications involving high positioning forces, it is common to include two or more convolutes of the course filled with balls in rolling contact with both leadscrew and follower along single, double or even triple helixes in parallel, as illustrated in FIG. 4, for the purpose of increasing the number of balls through which the positioning forces are applied. In accordance with the present invention, the convolute section of the follower may include cuts along, and substantially centered on the lands between grooves of multiple, parallel helixes over one or more revolutions or turns of each helix. The courses formed along each of such multiple helixes may include balls that roll and circulate in separate circuits to provide increased number of rolling balls and provide multiple resilient coupling 'coils' between end sections of the follower. In all of the aforementioned embodiments of the follower according to the present invention, the degree of comPliance or resiliency in the convolute section may be altered or controlled by selecting the number of turns cut from between the end sections, the thickness of the body of the follower in the convolute section, the width of the convolute (i.e. the pitch spacing between adjacent lands), and the material used in fabricating the follower.

Therefore, the ballscrew follower and method of making the same according to the present invention provides improved positional accuracy with substantially no deadband or backlash and without significantly increasing the operational torque requirements or the weight or the inertia. Further, the follower of the present invention compensates for anomalies in linearity and cylindricity without significantly altering the torque requirements during operation over such anomalies.

I claim:

1. Apparatus for operating with a leadscrew having a helical groove therein at a selected pitch along the length thereof; the apparatus comprising:

follower apparatus for relative rotational and translational motion with respect to the leadscrew, the follower apparatus having a head end and a tail end coupled by at least one convolute section therebetween that is axially spaced therefrom with the tail end resiliently coupled to the head end substantially only by the convolute section, and having a helical groove in a portion of the head end and in a portion of the tail end and in said convolute section at said selected pitch for forming with the groove in the leadscrew a course in which balls may rotate in contact with the grooves in said leadscrew and in said follower apparatus;

a plurality of balls disposed within said course to alter position along said course in response to relative rotation of the leadscrew and follower apparatus, the diameter of said balls being selected relative to the dimensions of said course to maintain said convolute section in a resilient torsionally expanded condition between said head end and said tail end; and return means coupled to said course at the head end and at the tail end for circulating said balls therein during relative rotation of the leadscrew and follower apparatus.

2. Apparatus as in claim 1 wherein said groove in the follower apparatus includes an elevated land between adjacent turns of the helical groove; and said convolute section is integrally-formed with the head end and with the tail end of the follower apparatus to support at least substantially one turn of the groove therein.

3. Apparatus as in claim 2 wherein:

said convolute section is formed substantially with one turn of approximately the width dimension and orientation from approximately one-half the width of a land between grooves to approximately one-half the width of the adjacent land between grooves.

4. Apparatus for operation with a leadscrew having a plural number of grooves therein forming parallel helices along the length thereof of selected pitch, the apparatus comprising:

follower apparatus for relative rotational and translational motion with respect to the leadscrew, the follower apparatus having a head end and a tail end coupled by t least one convolute section axially spaced therebetween with the tail end resiliently coupled to the head end substantially only by the convolute section, and having a corresponding plural number of helical grooves of said selected pitch for forming with corresponding grooves in the leadscrew a plural number of individual courses in which balls of selected diameter may rotate in contact with the grooves in said leadscrew and in said follower apparatus, said convolute section including a plural number of independent supports for each of the plural number of the grooves, each of said independent supports, including at least one turn between said head end and said tail end;

a plurality of balls disposed within said individual courses to alter position within said courses in response to relative rotation of the leadscrew and follower apparatus, the diameter of said balls being selected relative to the dimensions of said course to maintain said convolute section in a resilient torsionally expanded condition between said head end and said tail end; and return means coupled to said individual courses at the head end and at the tail end for circulating said balls therein during relative rotation of the leadscrew and follower apparatus.

* * * * *